United States Patent
Bender

[15] 3,658,441
[45] Apr. 25, 1972

[54] FLUID LINE RELEASER AND WASHER
[72] Inventor: Lloyd F. Bender, Route 5, Hayward, Wis. 54843
[22] Filed: Dec. 30, 1970
[21] Appl. No.: 102,781

[52] U.S. Cl. .................. 417/121, 119/14.06, 119/14.07, 417/130, 417/137
[51] Int. Cl. ................. A01j 3/00, A01j 5/10, F04f 1/06
[58] Field of Search .............. 417/121, 130, 137; 119/14.05, 119/14.06 X, 14.07 X, 14.18

[56] References Cited

UNITED STATES PATENTS

| | | | |
|---|---|---|---|
| 1,281,146 | 10/1918 | Davies | 119/14.05 |
| 3,224,413 | 12/1965 | Patterson | 119/14.07 |
| 3,111,112 | 11/1963 | Fjermestad | 119/14.18 X |
| 3,352,248 | 11/1967 | Bender | 417/137 X |
| 3,044,443 | 7/1962 | Baum | 119/14.18 X |

Primary Examiner—Carlton R. Croyle
Assistant Examiner—Richard E. Gluck
Attorney—James E. Nilles

[57] ABSTRACT

Fluid line releaser and washing apparatus for milk lines or the like and by means of which the system pumps milk from the milking area into a storage tank and furthermore the system may be cleaned in place without disassembling any of the parts. The system includes three separate vessels interconnected together and finds particular use when connected to a milk line and providing continuous vacuum thereto, the milk line being located at a relatively low elevation as compared to the milk storage tank or the like.

4 Claims, 6 Drawing Figures

United States Patent
Bender
[15] 3,658,441
[45] Apr. 25, 1972
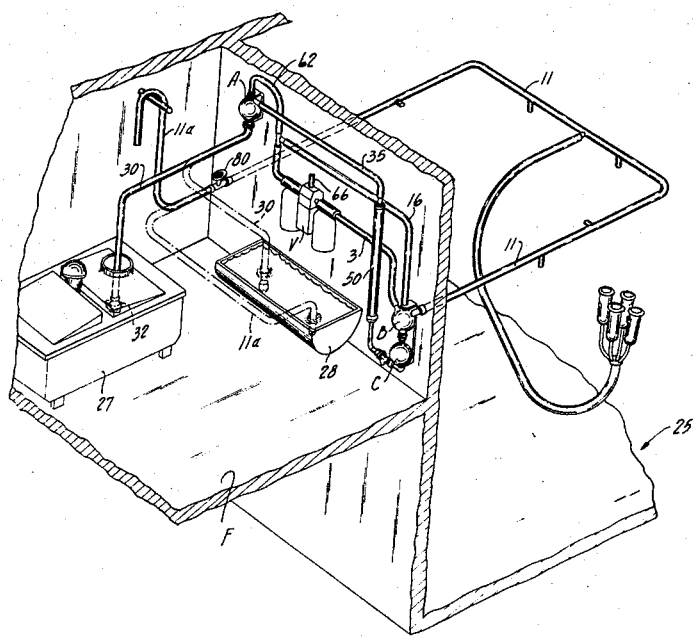

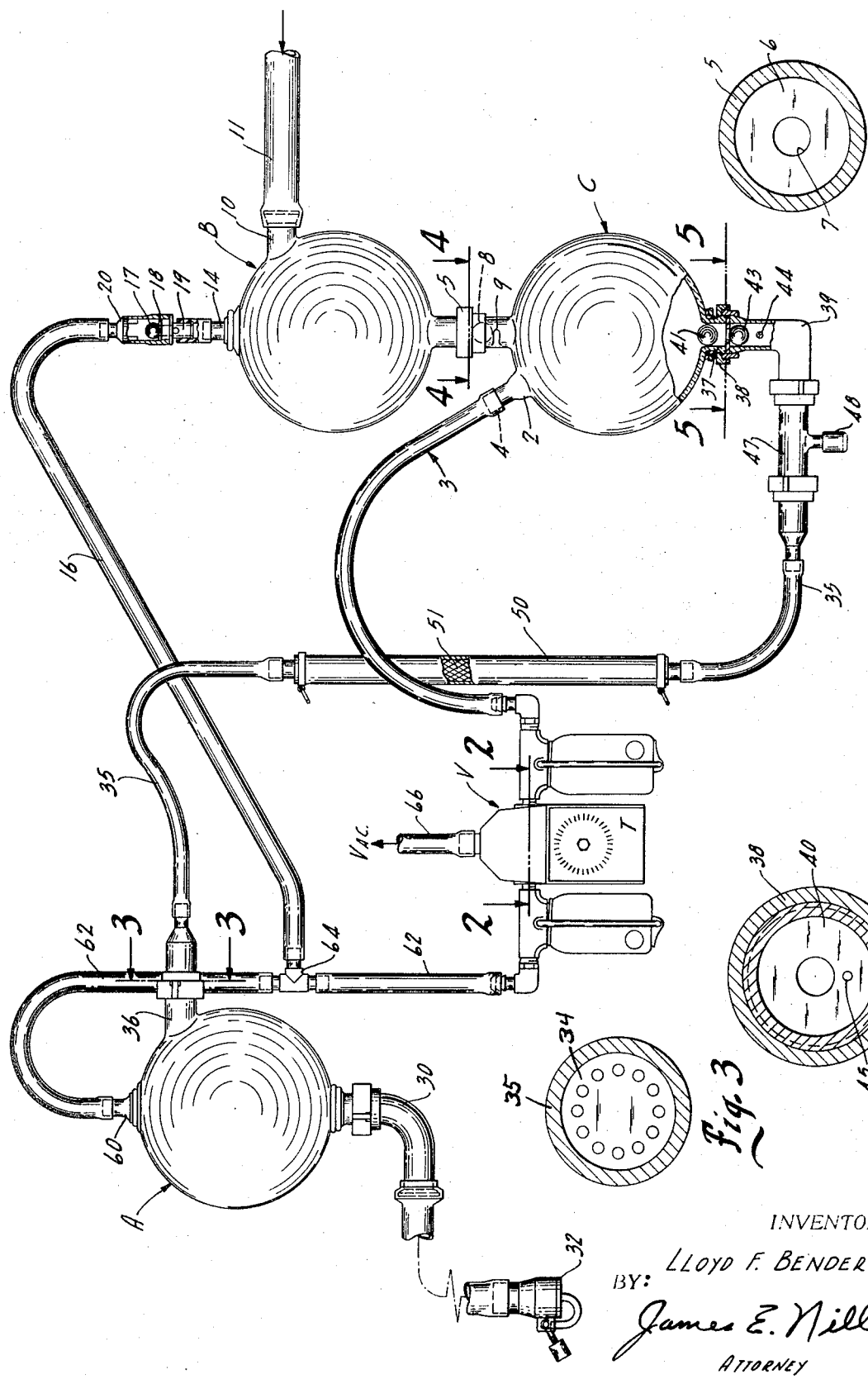

PATENTED APR 25 1972

INVENTOR:
LLOYD F. BENDER

BY: James E. Niller
ATTORNEY

FLUID LINE RELEASER AND WASHER

BACKGROUND OF THE INVENTION

The invention pertains generally to dairy equipment or the like by means of which fluid is conducted through a pipeline system to a central location where it is discharged into a bulk storage tank. Apparatus of this type is used with a pipeline milker located in a barn to convey milk to storage tanks or coolers located remotely from the pipeline milker. This apparatus and the milk lines must be thoroughly cleaned with a cleansing and sterilizing solution.

An example of prior art apparatus of this type is shown in my U.S. Pat. No. 3,191,576, issued June 29, 1965 and entitled "Milk Line Releaser and Washer Apparatus." That system discloses a two vessel apparatus for use with what might be termed high level milk lines, that is to say, milk lines that are elevated with respect to the bulk storage tank or the cleaning solution tank. Other examples of prior art equipment of this general type are shown in my following United States patents:

U.S. Pat. No. 3,424,098, issued Jan. 28, 1969 and entitled "Dump Valve for Fluid Conveying Apparatus";
U.S. Pat. No. 3,352,248, issued Nov. 14, 1967, entitled "Fluid Conveying Apparatus";
U.S. Pat. No. 3,322,100, issued May 30, 1967, entitled "Fluid Accumulator for Milk Line Equipment";
U.S. Pat. No. 3,310,061, issued Mar. 21, 1967, entitled "Milk Line Equipment"; and
U.S. Pat. No. 3,273,514, issued Sept. 20, 1966, entitled "Fluid Conveying Apparatus".

SUMMARY OF THE INVENTION

The present invention provides fluid line releasing and washing apparatus for use with milk lines or the like which are located at a relatively low elevation in comparison to the fluid storage or cleaning tanks. The present apparatus includes three vessels interconnected together and which can pump milk or the like without agitation from a relatively low milk line and deliver it to a storage tank at a higher elevation. The apparatus can also be cleaned in place without the necessity of disassembling any of the parts and whereby all areas which were in contact with the milk or other fluid being conveyed are also brought into intimate contact with the washing solution.

These and other objects and advantages of the present invention will appear hereinafter as this disclosure progresses, reference being had to the accompanying drawings.

BRIEF DESCRIPTION OF THE DRAWINGS

FIG. 1 is an elevational view of apparatus made in accordance with the present invention, certain parts being shown in section or broken away for the sake of clarity;

FIG. 3 is a sectional view taken along line 3—3 in FIG. 1 and showing the aperture plate for breaking up the flow of fluid into one of the vessels on an enlarged scale;

FIG. 4 is a sectional view taken along line 4—4 of FIG. 1 on an enlarged scale;

FIG. 5 is a sectional view taken along line 5—5 of FIG. 1 on an enlarged scale.

DESCRIPTION OF A PREFERRED EMBODIMENT

The apparatus provided by the present invention includes three separate vessels A, B, and C which are generally spherical in shape and made of transparent material, such as glass, so that they can be easily inspected and the action of the fluid passing therethrough readily noted. The construction of these vessels is shown for example in the U.S. Pat. No. 3,412,758, issued Nov. 26, 1968, entitled "Fluid Conveying Apparatus Having Two-Piece Slide Valve" and vessel C in particular includes an enlarged portion 2 adjacent its upper side for the purposes set forth in said patent. A flexible vacuum conduit 3 is attached to the nipple 4 of the enlarged portion 2 and places the vessel C in communication with a vacuum valve V.

Figure 6:
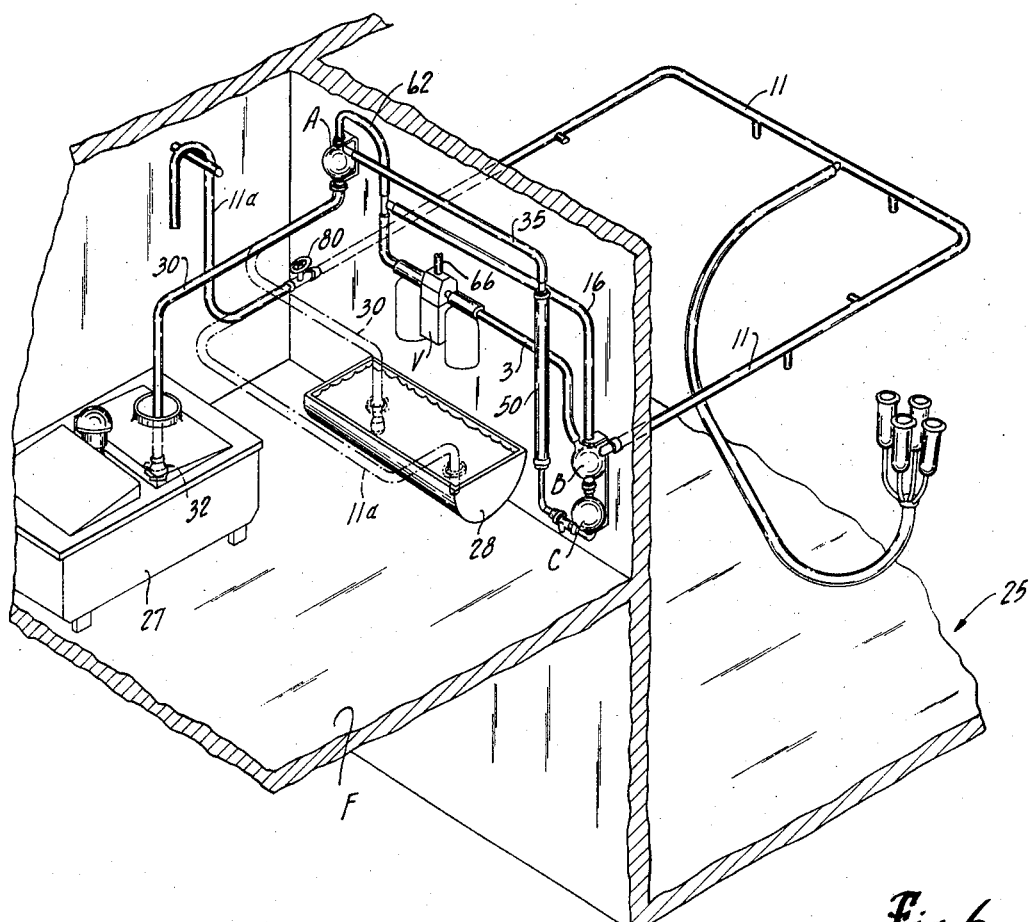
FIG. 6 is a perspective, fragmentary view of an installation of the present invention, certain parts being shown as broken away or removed for clarity.
Figure 2:
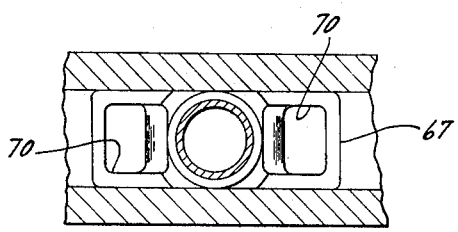
FIG. 2 is a sectional view taken generally along the line 2—2 of FIG. 1, but on an enlarged scale and showing the slide valve.

Vessel B is connected to vessel C by means of the detachable coupling 5, which coupling may be of the general type shown in FIG. 6 of said U.S. Pat. No. 3,273,514. It will be noted that a washer 6 having a central aperture 7 is positioned between the adjacent neck portions of vessels B and C and a nylon check ball 8 is located on a stop pin 9 in the neck of vessel C and also located at the underside of the apertured washer. The function of this apertured washer is to check the flow of fluid in the upward direction only. Vessel B has a side nipple 10 which is connected to the milk line 11 that extends throughout the barn area and which receives milk from the milking machines 12 in the known manner. The nipple 10 is positioned in vessel B adjacent its top side. The upper, central nipple 14 of the vessel B is connected to a flexible vacuum conduit 16 by means of an intervening one-way check ball 17 which acts to prevent flow of air from conduit 16 downwardly into vessel B. In other words, the ball 17 acts to bear against the side 18 of the insert 19 so as to check the flow of air in a downward direction. As will appear, the valve 17 thus acts to prevent the loss of vacuum in vessel B when free air is admitted to vessel A and when vacuum is applied at its lower end through vessel C and from line 3, as will appear.

If a further description of the valve 17, the insert 19, or the housing 20 is deemed to be either necessary or desirable, reference may be had to my said U.S. Pat. No. 3,424,098.

By way of general explanation, the system is used to raise liquid from a lower level to a higher level, and a constant vacuum is provided on the milk line 11. More specifically, the vessel C is intermittently subjected to vacuum or atmospheric conditions and the vessel B is always subjected to vacuum either via line 16 or via the vessel C and line 3, as will more fully appear.

Vessels C and B, in accordance with the present invention may be located at an elevation considerably lower than the vessel A. Vessel B receives milk from the line 11 which may be located at a low elevation. The milk line is arranged to slope toward vessel B so that draining of the line by gravity can occur. As shown in FIG. 6 for example, vessel C may actually be located adjacent a floor F of the milk room which is adjacent to the barn area 25 which is at a considerably lower level than the milk room. The vessel A on the other hand is located at a higher elevation and above the bulk storage tank 27 or the tank 28 which contains the washing solution.

The third vessel A is of the same construction as vessel B and has a lower discharge conduit 30 that can be alternately swung to deposit milk in the bulk storage tank 27 when the milking operation is underway, or can be swung to the wash tank 28 so as to deposit cleansing solution in the tank when the equipment is being cleaned in place. A conventional one-way flapper valve 32 is located at the end of the conduit 30 so as to prevent fluid from being drawn up into vessel A when it is subjected to vacuum, as will appear. A fluid conveying conduit 35 is connected via a distribution gasket 34 to the upper side outlet nipple 36 of the vessel A and places vessel A in communication with the lower side of vessel C. More specifically, the lower nipple 37 of vessel C is connected by conventional, removable gasket means 38, similar to gasket means 5, to the elbow 39. A central apertured washer 40 is located between the lower nipple 37 and the elbow 39 and an upper ball 41 is located above the washer 40, and generally floats in the fluid in the vessel C. However, when the fluid is drawn downwardly from vessel C, ball 41 seats against the aperture in washer 40 thereby preventing air from entering conduit 35 and thus preventing churning of the fluid.

Another ball 43 is located at the underside of washer 40 and is held adjacent the washer by means of stop pin 44 in the elbow, in the known manner. This ball 43 acts to check in the upward direction when vessel C is submitted to vacuum from conduit 3.

In connection with the washer 40, it will also be noted that a small drain hole 45 is provided for draining the remaining water out of vessel C after the ball 41 has checked in a downward direction. It will also be noted that line 35 includes a glass tee 47 having a removable cap 48 in its lower leg. This cap can be removed during the washing cycle to permit air to enter the conduit 35 to thereby help wash the system with slugs of air. Conduit 35 may also contain a filter 50 which includes an inner filter bag 51.

The vessel A has an upper central nipple 60 to which is connected a flexible conduit 62 which communicates with a vacuum and atmosphere applying valve V. It will be noted that vacuum conduit 16 leading from the upper portion of vessel B is also connected in conduit 62 by the T-joint 64.

The valve V has a vacuum line 66 connected to a constant source of vacuum (not shown) such as a vacuum pump and therefore vacuum is always drawn from the valve V via conduit 66.

The valve V is of the type shown in my said U.S. Pat. No. 3,310,061 except that the shiftable valve plate 67 has holes 70 extending through both of its sides so that vessel A can be subjected to atmospheric pressure and thereby able to drain out conduit 30 when vacuum is applied to line 3 to the lower vessel C. In other words, hole 70 is located in the side of the slide valve 67 to let atmospheric air enter line 62 when vacuum is applied to vessel C, so that vessel A can drain by gravity to either the bulk tank or the solution tank, ball 17 at that time acting to check in the downward direction and preventing vacuum from being applied through vacuum conduit 16 and vessel A.

The general operation of the apparatus is as follows. The valve V has an electric motor timer T so that vacuum is applied continuously to the first vessel B either through the lower second vessel C and conduit 3 from one side of the valve, or through the upper conduit 16 and a portion of conduit 62 from the other side of the valve V. Thus, the milk line is always subjected to vacuum and constantly draws milk from the line 11 during the milking operation.

The second vessel C is intermittently subjected to vacuum as above indicated and it receives the fluid from the first vessel B, fluid being free to flow downwardly past the check ball 8. When the valve V shifts so that conduit 3 is open to atmosphere via the shiftable valve plate, then the vessel C is subjected to atmosphere and the vessel B is then subjected to vacuum via line 16 causing ball 8 to check in the upward direction. Vessel C is then drained of its fluid by means of the vacuum then being applied to the third vessel A and consequently, the vacuum in conduit 35 connected with the lower side of vessel C. Thus, the second vessel C is drained by the vacuum action in the third vessel A and vessel A fills with fluid. When vessel A is then subjected to vacuum as determined by the timer of valve V, the fluid valve 32 at the lower end of conduit 30 is sucked to the closed position. When vessel A is subsequently subjected to atmospheric pressure, as when valve V shifts, then the fluid valve 32 opens, thereby permitting fluid from vessel A to drain into the storage tank.

The general operation of the apparatus is such that a continuous suction is applied to the milk line 11, the valve 80 (FIG. 6) being closed, to constantly draw milk from the line and then the action of the valve V is such that the vessels A and C are intermittently subjected to vacuum or atmosphere to thereby create the pumping, pulsating action of the apparatus.

After the milking operation has been completed, the valve 80 at the end of the milking line is opened and the flexible end portion 11a of the line is placed in the cleaning solution tank 28. The end of conduit 30 is removed from the storage tank 27 and placed in the solution tank 28.

The apparatus is then started and causes a complete cleaning of the entire apparatus with the cleaning solution being drawn from and returned to the cleaning solution tank 28.

I claim:

1. Fluid line releaser and washer apparatus comprising, a first vessel connected with a fluid line for drawing fluid therefrom, a second vessel located beneath said first vessel and in communication therewith; one-way check valve between said vessels for checking the flow between said vessels in an upward direction, a vacuum and atmosphere applying valve, a conduit between said vacuum and atmosphere applying valve and said second vessel, a third vessel, a second conduit connection between said third vessel and said vacuum and atmosphere applying valve; a fluid conveying conduit between said second vessel and said third vessel, and a vacuum conduit connected between the upper portion of said first vessel and the said second conduit, and a one-way check valve means located adjacent said first vessel for checking flow downwardly into said first vessel from said vacuum conduit, and a check valve in said second vessel for checking flow in a downward direction when fluid is drawn from said second vessel by said third vessel, a second one-way check valve adjacent said second vessel for checking flow into said second vessel from said fluid conveying conduit when vacuum is applied to said second vessel, said vacuum and atmosphere applying valve including an electric timer for causing said valve to alternately apply vacuum to said second vessel and said third vessel and also to alternately permit said second vessel and said third vessel to be subjected to atmosphere.

2. The arrangement set forth in claim 1 including a storage tank and a washing solution tank, and a discharge conduit from said third vessel and being swingable to either one of said tanks.

3. Fluid line releaser and washer apparatus for use with milk lines or the like, said apparatus comprising, a first vessel connected adjacent its upper side with a fluid line for drawing fluid therefrom, a second vessel located beneath said first vessel and in communication therewith; one-way check valve between said vessels for checking the flow between said vessels in an upward direction but permitting flow of fluid downward from said first vessel to said second vessel, and also for permitting vacuum to be drawn from said first vessel through said second vessel; a vacuum and atmosphere applying valve, a conduit between said vacuum and atmosphere applying valve and said second vessel, a third vessel, a second conduit connection between the upper portion of said third vessel and said vacuum and atmosphere applying valve; a fluid conveying conduit between the lower portion of said second vessel and an upper portion of said third vessel whereby when said third vessel is subjected to vacuum by means of said vacuum and atmosphere applying valve, then fluid flows from said second vessel into said third vessel via said fluid conveying conduit; and a vacuum conduit connected between the upper portion of said first vessel and the said second conduit between the third vessel and said vacuum and atmosphere applying valve, and a one-way check valve means located adjacent the upper portion of said first vessel for checking flow downwardly into said first vessel from said vacuum conduit, and a check valve in said second vessel for checking flow in a downward direction when fluid is drawn from said second vessel by said third vessel, a second one-way check valve adjacent the lower portion of said second vessel for checking flow into said second vessel from said fluid conveying conduit when vacuum is applied to said second vessel, said vacuum and atmosphere applying valve including an electric timer for causing said vacuum and atmosphere applying valve to alternately apply vacuum to said second vessel and said third vessel and also to alternately permit said second vessel and said third vessel to be subjected to atmosphere, whereby said first vessel is continuously subjected to vacuum either via said second vessel or the conduit extending from its upper side, to thereby cause fluid to continuously flow into said first vessel and be periodically dumped into said second vessel, and said second vessel is then periodically emptied into said third vessel by vacuum in said third vessel, said third vessel also having a discharge conduit connected at its bottom side for conveying fluid therefrom to a tank.

4. The arrangement set forth in claim 3 including a storage tank and a washing solution tank, said discharge conduit from said third vessel being swingable to either one of said tank.

* * * * *